United States Patent
Kim et al.

(10) Patent No.: US 9,278,688 B2
(45) Date of Patent: Mar. 8, 2016

(54) FAIL-SAFE DEVICE AND FAIL-SAFE METHOD FOR ENGINE CLUTCH ACTUATOR FOR HYBRID VEHICLE

(71) Applicant: Hyundai Motor Company, Seoul (KR)

(72) Inventors: Tae Ho Kim, Seoul (KR); Jong Hyun Kim, Gyeonggi-Do (KR); Young Chul Kim, Gyeonggi-Do (KR); Hak Sung Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/549,784

(22) Filed: Nov. 21, 2014

(65) Prior Publication Data

US 2015/0258987 A1 Sep. 17, 2015

(30) Foreign Application Priority Data

Mar. 14, 2014 (KR) .......................... 10-2014-0030013

(51) Int. Cl.
| | |
|---|---|
| *B60W 20/00* | (2006.01) |
| *B60W 10/02* | (2006.01) |
| *B60W 10/06* | (2006.01) |
| *B60T 13/74* | (2006.01) |
| *F16D 28/00* | (2006.01) |
| *F16D 29/00* | (2006.01) |

(52) U.S. Cl.
CPC ............... *B60W 20/50* (2013.01); *B60W 10/02* (2013.01); *B60W 10/06* (2013.01); *B60W 20/40* (2013.01); *B60T 13/745* (2013.01); *F16D 28/00* (2013.01); *F16D 29/005* (2013.01); *Y10S 903/914* (2013.01); *Y10S 903/93* (2013.01); *Y10T 477/26* (2015.01)

(58) Field of Classification Search
None
See application file for complete search history.

(56) References Cited

U.S. PATENT DOCUMENTS

| | | | |
|---|---|---|---|
| 6,957,533 B1* | 10/2005 | Olsson | E05F 3/102 605/545 |
| 2006/0042907 A1* | 3/2006 | Ronk | F16D 48/04 192/85.59 |
| 2009/0314602 A1* | 12/2009 | Pritchard | F16D 48/02 192/103 F |
| 2013/0020169 A1 | 1/2013 | Eich et al. | |
| 2014/0028083 A1* | 1/2014 | Gerdes | B60T 1/10 303/6.01 |

FOREIGN PATENT DOCUMENTS

| | | |
|---|---|---|
| JP | 2007-321963 A | 12/2007 |
| JP | 2009-035241 A | 2/2009 |
| KR | 10-0706554 B1 | 4/2007 |
| KR | 10-2010-0034709 A | 4/2010 |
| KR | 10-2012-0107663 A | 10/2012 |
| KR | 10-2013-0101893 A | 9/2013 |

* cited by examiner

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A fail-safe device and a fail-safe method for an engine clutch actuator for a hybrid vehicle may facilitate conversion into a hybrid electric vehicle (HEV) mode even upon failure of an engine clutch actuator by diagnosing a failure state of an electric vehicle (EV) mode due to failure of the engine clutch actuator using a pressure sensor mounted on an actuator master cylinder of the engine clutch actuator when a driving mode is converted from the EV mode to the HEV mode, transmitting a diagnostic signal to a hybrid control unit, and allowing hydraulic oil in the actuator master cylinder to be easily supplied into a concentric slave cylinder using a separate emergency actuator when the driving mode is converted from the EV mode to the HEV mode.

6 Claims, 3 Drawing Sheets

FAIL-SAFE DEVICE AND FAIL-SAFE METHOD FOR ENGINE CLUTCH ACTUATOR FOR HYBRID VEHICLE

CROSS-REFERENCE TO RELATED APPLICATION

This application claims under 35 U.S.C. §119(a) the benefit of Korean Patent Application No. 10-2014-0030013 filed on Mar. 14, 2014, the entire contents of which are incorporated herein by reference.

BACKGROUND (a) Technical Field

The present disclosure relates to a fail-safe device and a fail-safe method for an engine clutch actuator for a hybrid vehicle. More particularly, it relates to a fail-safe device and a fail-safe method for an engine clutch actuator for a hybrid vehicle, which facilitate conversion from an electric vehicle (EV) mode to a hybrid electric vehicle (HEV) mode when an actuator for a dry type engine clutch fails, and enable synchronization between an engine and an engine clutch to be performed by operating the engine in advance.

(b) Description of the Related Art

A hybrid vehicle, which is a kind of environmentally-friendly vehicle, may implement various power transmission structures using an engine and a driving motor as power sources, and usually includes driving modes such as an EV mode in which the vehicle travels using only driving power of the driving motor, and an HEV mode in which the vehicle travels using driving power from both the engine and the driving motor.

The HEV mode in which the vehicle travels while power from the engine is output together with power from the driving motor is implemented at the time of engaging an engine clutch disposed between the engine and the driving motor, and the EV mode in which power of the engine is shut off and the vehicle travels using only power from the driving motor is implemented at the time of disengaging the engine clutch.

In a case in which a dry type engine clutch is applied as the engine clutch, a separate engine clutch actuator for operating the engine clutch is mounted in order to perform conversion into the HEV mode or the EV mode, and the engine clutch actuator (E/C ACT) is applied to a hybrid system that is provided based on a dual clutch transmission (DCT).

Hereinafter, a configuration of an engine clutch actuator in the related art will be described with reference to FIG. 1 (RELATED ART).

In FIG. 1 (RELATED ART), reference numeral 10 indicates an engine clutch actuator that uses electricity and hydraulic pressure.

The engine clutch actuator 10 is disposed between an engine 30 and a driving motor 40, and serves to engage an engine clutch 20 with an engine side in the HEV mode that is performed using power from both the engine and the driving motor. In contrast, in the EV mode that is performed using only power from the driving motor, the engine clutch actuator 10 serves to disengage the engine clutch 20 from the engine side.

An electric motor 11 is disposed at one side of the engine clutch actuator 10, and an actuator master cylinder 14 is disposed at the other side of the engine clutch actuator 10.

A screw shaft 12 is adopted as an output shaft of the electric motor, and a rectilinearly movable block 13 is fastened to the screw shaft 12 in an inserted manner.

In addition, a first piston 15 is disposed in the actuator master cylinder 14, and a back side of the first piston 15 is connected with the rectilinearly movable block 13 by a piston rod.

The actuator master cylinder 14 is connected with a concentric slave cylinder 17 by a hydraulic pipe 16 so as to exchange the hydraulic oil with the concentric slave cylinder 17.

A second piston 19 is disposed in the concentric slave cylinder 17, the second piston 19 is connected with a pressing plate 18 by a piston rod, and the engine clutch 20 is mounted on the pressing plate 18.

In this case, a flywheel 21 of the engine is positioned at a side that faces the engine clutch 20.

Hereinafter, an operation flow of the engine clutch actuator having the aforementioned configuration will be described.

Conversion from HEV Mode to EV Mode

First, a local control unit (LCU), which receives a signal from a hybrid control unit (HCU), operates the electric motor 11.

Therefore, the screw shaft 12 is rotated in a forward direction by the operation of the electric motor 11, and the rectilinearly movable block 13 is rectilinearly moved in a forward direction.

Consecutively, the rectilinearly movable block 13 pulls the first piston 15 in the actuator master cylinder 14 in the forward direction, and at the same time, the second piston 19, which is moved in a rearward direction by elastic restoring force of a return spring, presses the hydraulic oil in the concentric slave cylinder 17, such that the hydraulic oil is supplied into the actuator master cylinder 14 through the hydraulic pipe 16.

In this case, as the second piston 19 is moved in the rearward direction, the engine clutch 20 connected with the pressing plate 18 is separated from the flywheel 21 of the engine, and as a result, the engine clutch is in a disengaged state.

When the engine clutch is in the disengaged state as described above, the vehicle travels in the EV mode that uses only power from the driving motor instead of using power from the engine.

Conversion from EV Mode to HEV Mode

The screw shaft 12 of the electric motor 11 is rotated in a reverse direction, and the rectilinearly movable block 13 is rectilinearly moved in the rearward direction.

Consecutively, the rectilinearly movable block 13 pushes the first piston 15 in the actuator master cylinder 14 in the rearward direction, and at the same time, the hydraulic oil in the actuator master cylinder 14 is supplied into the concentric slave cylinder 17 through the hydraulic pipe 16 by pressing force of the first piston 15.

Consecutively, the hydraulic oil supplied into the concentric slave cylinder 17 pushes the second piston 19 in the forward direction, such that the second piston 19 is moved forward while compressing the return spring, and pushes the pressing plate 18.

Therefore, the engine clutch 20 connected with the pressing plate 18 is coupled to the flywheel 21 of the engine, and as a result, the engine clutch is in an engaged state.

When the engine clutch is in the engaged state as described above, the HEV mode in which the vehicle travels using power from both the engine and the driving motor is implemented.

As described above, the dry type engine clutch is engaged or disengaged by the engine clutch actuator, such that the HEV mode or the EV mode may be easily implemented.

In a case in which the electric motor cannot be operated, that is, the electric motor fails because of various reasons such as burnout of the electric motor of the engine clutch actuator or disconnection of lines for supplying electric power to the electric motor when the vehicle travels in the EV mode as described above, a controller may determine that it is difficult to allow the vehicle to continuously travel in the EV mode, and may apply logic for commanding the conversion into the HEV mode.

However, because the rectilinearly movable block 13, and the first piston 15 in the actuator master cylinder 14 as well as the screw shaft 12 cannot be moved due to the failure of the electric motor, the hydraulic oil in the actuator master cylinder 14 cannot be supplied into the concentric slave cylinder 17, and as a result, there is a problem in that the engine clutch cannot be engaged, and the conversion into the HEV mode cannot be properly performed.

Particularly, if the engine is not operated even when the driving mode is converted from the EV mode to the HEV mode, there is a problem in that a large amount of vibration and noise may occur due to a collision between the engine in a stationary state and the engine clutch that is connected with the driving motor and rotated.

The above information disclosed in this Background section is only for enhancement of understanding of the background of the invention and therefore it may contain information that does not form the prior art that is already known in this country to a person of ordinary skill in the art.

SUMMARY

The present invention provides a fail-safe device and a fail-safe method for an engine clutch actuator for a hybrid vehicle, which may facilitate conversion into the HEV mode even at the time of failure of the engine clutch actuator by diagnosing a failure state of the EV mode due to failure of the engine clutch actuator using a pressure sensor mounted on an actuator master cylinder of the engine clutch actuator when a driving mode is converted from the EV mode to the HEV mode, transmitting a diagnostic signal to a hybrid control unit, and allowing hydraulic oil in the actuator master cylinder to be easily supplied into a concentric slave cylinder by operating a separate emergency actuator when the driving mode is converted from the EV mode to the HEV mode, and may implement synchronization of the engine and the engine clutch by operating the engine in advance by the hybrid control unit that receives the diagnostic signal.

In one aspect, the present invention provides a fail-safe device for an engine clutch actuator for a hybrid vehicle, including: a drive means which is disposed between an engine and a driving motor, engages the engine clutch with an engine side in an HEV mode, and disengages the engine clutch from the engine side in an EV mode, the drive means including: an electric motor having a screw shaft; a rectilinearly movable block which is fastened to the screw shaft so as to be rectilinearly movable; an actuator master cylinder which is filled with hydraulic oil; a first piston which is installed in the actuator master cylinder so as to press the hydraulic oil, and connected with the rectilinearly movable block; a concentric slave cylinder which is connected with the actuator master cylinder so as to exchange the hydraulic oil with the actuator master cylinder; and a second piston which is installed in the concentric slave cylinder, and presses the engine clutch toward the engine so as to engage the engine clutch with the engine side by pressure of the hydraulic oil, in which a separate emergency actuator, which presses the hydraulic oil in the actuator master cylinder into the concentric slave cylinder when the rectilinearly movable block and the first piston are stopped at the time of failure of the electric motor, is mounted on the actuator master cylinder.

In a preferred embodiment, a pressure sensor, which measures hydraulic oil pressure in the actuator master cylinder and transmits a measured pressure value to a hybrid control unit, may be mounted on the actuator master cylinder.

In another aspect, the present invention provides a fail-safe method for an engine clutch actuator for a hybrid vehicle, including: a first step of diagnosing a failure state of the engine clutch actuator when a driving mode is converted from an EV mode to an HEV mode; a second step of increasing pressure in an actuator master cylinder by operating an emergency actuator mounted on the actuator master cylinder when the failure state of the engine clutch actuator is determined; a third step of operating, by a hybrid control unit, an engine in advance before an engine clutch is engaged when pressure in the actuator master cylinder is increased; a fourth step of supplying hydraulic oil in the actuator master cylinder into a concentric slave cylinder by the increase in pressure in the actuator master cylinder due to the operation of the emergency actuator; and a fifth step of synchronizing and engaging the engine clutch with the engine, which is being operated in advance, while a second piston presses the engine clutch by the hydraulic oil supplied into the concentric slave cylinder.

In a preferred embodiment, in the first step, when there is no variation in pressure measured by a pressure sensor mounted on the actuator master cylinder, the failure state of the engine clutch actuator may be determined by considering that there is no variation in pressure of the hydraulic oil for the conversion into the HEV mode, and the determined signal may be transmitted to the hybrid control unit.

In another preferred embodiment, in the second step, the emergency actuator mounted on the actuator master cylinder may be operated by a command of the hybrid control unit that has recognized the failure state of the engine clutch actuator, and may press the hydraulic oil in the actuator master cylinder toward the concentric slave cylinder.

In still another preferred embodiment, in the third step, the pressure sensor mounted on the actuator master cylinder may measure hydraulic oil pressure in the actuator master cylinder, and the engine may be operated in advance before the engine clutch is engaged when a measured pressure value is an average pressure value or more.

Through the aforementioned technical solutions, the present invention provides the effects below.

Firstly, even though the engine clutch actuator for operating a dry type engine clutch fails when a driving mode is converted from the EV mode to the HEV mode, the engagement of the engine clutch for conversion into the HEV mode may be easily performed by pressing the hydraulic oil in the actuator master cylinder toward the concentric slave cylinder using the separate emergency actuator.

Secondly, before the engine clutch is engaged, a variation in pressure in the actuator master cylinder is measured using the pressure sensor mounted on the actuator master cylinder, and the engine is operated in advance when a measured pressure value is greater than an average value, such that the engine clutch connected to the driving motor may be synchronized and engaged with the engine when the engine clutch is connected to the engine.

Accordingly, it is possible to solve the problem in the related art that the engine is not operated even when the driving mode is converted from the EV mode to the HEV mode, and a large amount of vibration and noise occurs due to a collision between the engine in a stationary state and the engine clutch that is connected with the driving motor and rotated.

Other aspects and preferred embodiments of the invention are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
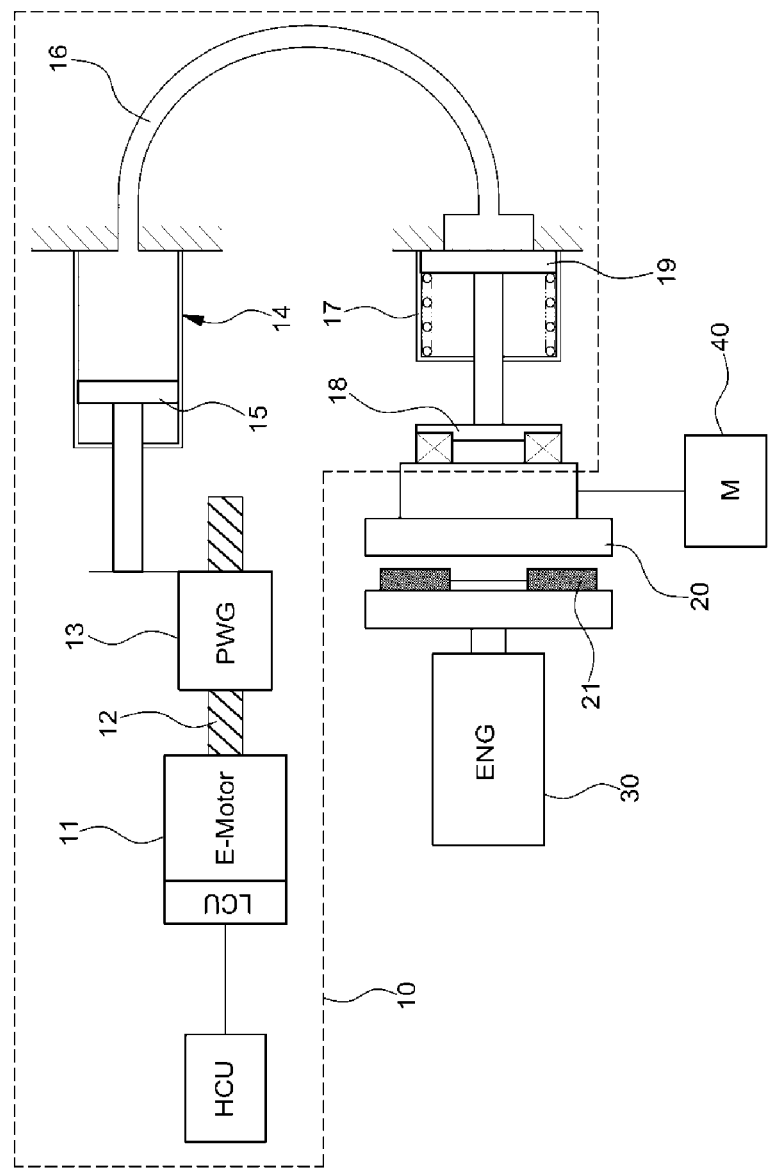
FIG. 1 (RELATED ART) is a schematic view illustrating an engine clutch actuator in the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

As described above, in a case in which a dry type engine clutch is applied as an engine clutch that is disposed between an engine and a driving motor so as to be capable of transmitting power, a separate engine clutch actuator for operating the engine clutch is mounted in order to perform conversion into an HEV mode or an EV mode, and the engine clutch actuator (E/C ACT) is applied to a hybrid system that is provided based on a dual clutch transmission (DCT).

Figure 2:
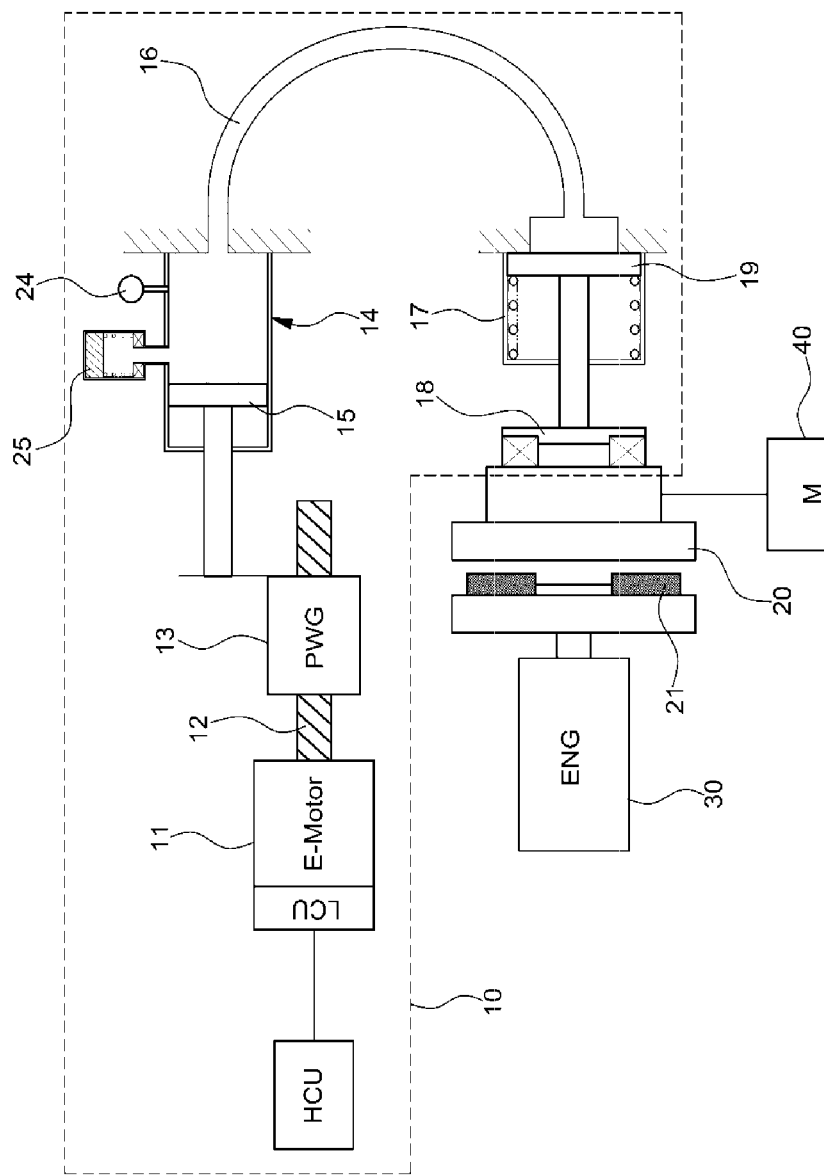
FIG. 2 is a schematic view illustrating a fail-safe device for an engine clutch actuator for a hybrid vehicle according to the present invention.

Hereinafter, a configuration of a fail-safe device for an engine clutch actuator for a hybrid vehicle according to the present invention will be described with reference to the attached FIG. 2.

An engine clutch actuator 10 is disposed between an engine 30 and a driving motor 40, and serves to engage an engine clutch 20 with the engine side in the HEV mode that is performed using power from both the engine and the driving motor. In contrast, in the EV mode that is performed using only power from the driving motor, the engine clutch actuator 10 serves to disengage the engine clutch 20 from the engine side.

An electric motor 11 is disposed at one side of the engine clutch actuator 10, and an actuator master cylinder 14 is disposed at the other side of the engine clutch actuator 10.

A screw shaft 12 is adopted as an output shaft of the electric motor, and a rectilinearly movable block 13 is fastened to the screw shaft 12 in an inserted manner.

A first piston 15 is disposed in the actuator master cylinder 14, and a back side of the first piston 15 is connected with the rectilinearly movable block 13 by a piston rod.

The actuator master cylinder 14 is connected with a concentric slave cylinder 17 by a hydraulic pipe 16 so as to exchange hydraulic oil with the concentric slave cylinder 17.

A second piston 19 is disposed in the concentric slave cylinder 17, the second piston 19 is connected with a pressing plate 18 by a piston rod, and the engine clutch 20 is mounted on the pressing plate 18.

In this case, a flywheel 21 of the engine is positioned at a side that faces the engine clutch 20.

According to the present invention, a solenoid type separate emergency actuator 25 is mounted on the actuator master cylinder 14, and the emergency actuator 25 is turned on in order to press the hydraulic oil in the actuator master cylinder 14 toward the concentric slave cylinder 17 when the engine clutch actuator 10 fails.

A pressure sensor 24, which measures a variation in hydraulic oil pressure in the actuator master cylinder 14 and transmits a measured pressure value to a hybrid control unit, is mounted.

Figure 3:
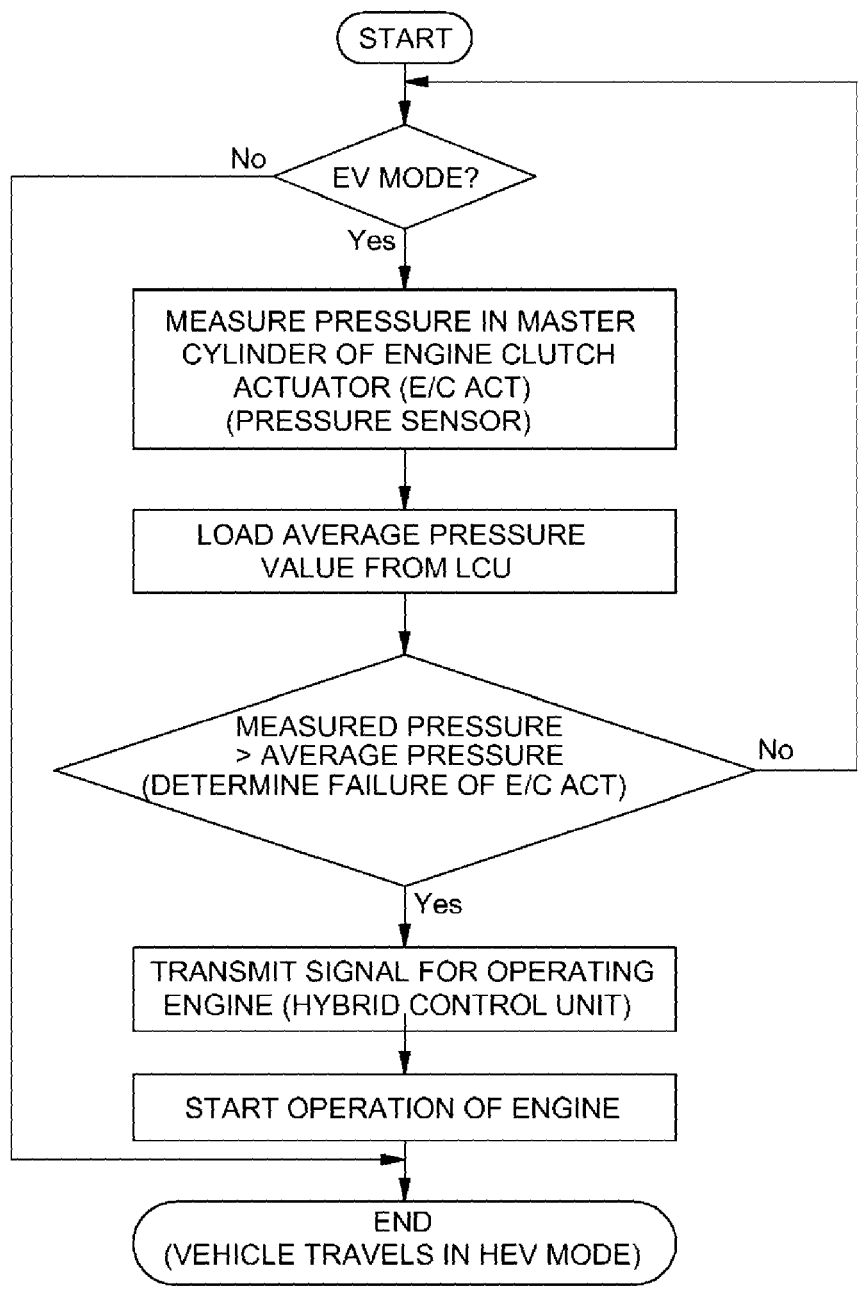
FIG. 3 is a flowchart illustrating a fail-safe method for an engine clutch actuator for a hybrid vehicle according to the present invention.

Hereinafter, a fail-safe method for an engine clutch actuator for a hybrid vehicle according to the present invention will be described with reference to the attached FIGS. 2 and 3.

The EV mode, which uses only power from the driving motor instead of using power from the engine, is implemented in a state in which the engine clutch 20 is disengaged.

The electric motor cannot be operated, that is, the engine clutch actuator may fail because of various reasons such as burnout of the electric motor of the engine clutch actuator or disconnection of lines for supplying electric power to the electric motor when the vehicle travels in the EV mode.

When the engine clutch actuator fails, a controller may determine that it is difficult to allow the vehicle to continuously travel in the EV mode, and may apply logic for commanding conversion into the HEV mode.

In this case, when the hydraulic oil pressure in the actuator master cylinder 14 is increased, the first piston 15 normally presses the hydraulic oil in the actuator master cylinder 14 toward the concentric slave cylinder 17.

However, when the engine clutch actuator fails, the first piston 15 cannot be moved, and as a result, the hydraulic oil in the actuator master cylinder 14 cannot be supplied into the concentric slave cylinder 17, such that the engagement of the engine clutch for the HEV mode is not performed.

Therefore, the failure state of the engine clutch actuator 10 is diagnosed when the driving mode is converted from the EV mode to the HEV mode, and in a case in which there is no variation in pressure measured by the pressure sensor 24 mounted on the actuator master cylinder 14, the failure state of the engine clutch actuator 10 is determined by considering that there is no variation in pressure of the hydraulic oil for the conversion into the HEV mode, and the determined signal is transmitted to the hybrid control unit.

Next, when the failure state of the engine clutch actuator 10 is determined, the hybrid control unit operates the emergency actuator 25 mounted on the actuator master cylinder 14 so as to increase pressure in the actuator master cylinder 14.

That is, when the emergency actuator 25 is turned on in a state in which the first piston 15 is stopped, a piston of the emergency actuator 25 protrudes into the actuator master cylinder 14 so as to press the hydraulic oil in the actuator master cylinder 14.

In other words, the emergency actuator 25 mounted on the actuator master cylinder 14 is turned on by a command of the hybrid control unit that has recognized the failure state of the engine clutch actuator 10, and presses the hydraulic oil in the actuator master cylinder 14 toward the concentric slave cylinder 17.

In this case, hydraulic oil pressure in the actuator master cylinder 14 is increased by the operation of the emergency actuator 25, and the pressure sensor 25 measures the increasing hydraulic oil pressure, and transmits a measured pressure value to the hybrid control unit.

In more detail, the pressure sensor 24 mounted on the actuator master cylinder 14 measures hydraulic oil pressure in the actuator master cylinder 14, and transmits a measured pressure value to the hybrid control unit, and the hybrid control unit operates the engine 30 when the measured pressure value is an average pressure value or more.

That is, the hybrid control unit operates the engine 30 in advance before the engine clutch 20 is engaged.

Next, by the increase in pressure in the actuator master cylinder 14 due to the operation of the emergency actuator 25, the hydraulic oil in the actuator master cylinder 14 is pressed and supplied into the concentric slave cylinder 17.

Consecutively, the second piston 19 presses the engine clutch 20 by the hydraulic oil supplied into the concentric slave cylinder 17, and as a result, the engine clutch 20, which is being rotated by being connected with the driving motor 40, is synchronized and engaged with the flywheel 21 of the engine 30 that is being operated in advance.

As described above, the engine clutch and the engine are synchronized and connected with each other even in the failure state of the engine clutch actuator 10, and as a result, the conversion from the EV mode to the HEV mode may be easily performed without the occurrence of impact and noise.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fail-safe device for an engine clutch actuator for a hybrid vehicle, comprising:
a drive means which is disposed between an engine and a driving motor, engages the engine clutch with an engine side in a hybrid electric vehicle (HEV) mode, and disengages the engine clutch from the engine side in an electric vehicle (EV) mode, the drive means including:
an electric motor having a screw shaft;
a rectilinearly movable block which is fastened to the screw shaft so as to be rectilinearly movable;
an actuator master cylinder which is filled with hydraulic oil;
a first piston which is installed in the actuator master cylinder so as to press the hydraulic oil, and connected with the rectilinearly movable block;
a concentric slave cylinder which is connected with the actuator master cylinder so as to exchange the hydraulic oil with the actuator master cylinder; and
a second piston which is installed in the concentric slave cylinder, and presses the engine clutch toward the engine so as to engage the engine clutch with the engine side by pressure of the hydraulic oil,
wherein a separate emergency actuator, which presses the hydraulic oil in the actuator master cylinder into the concentric slave cylinder when the rectilinearly movable block and the first piston are stopped at the time of failure of the electric motor, is mounted on the actuator master cylinder.

2. The fail-safe device of claim 1, wherein a pressure sensor, which measures hydraulic oil pressure in the actuator master cylinder and transmits a measured pressure value to a hybrid control unit, is mounted on the actuator master cylinder.

3. A fail-safe method for an engine clutch actuator for a hybrid vehicle, comprising:
a first step of diagnosing a failure state of the engine clutch actuator when a driving mode is converted from an electric vehicle (EV) mode to a hybrid electric vehicle (HEV) mode;
a second step of increasing pressure in an actuator master cylinder by operating an emergency actuator mounted on the actuator master cylinder when the failure state of the engine clutch actuator is determined;
a third step of operating, by a hybrid control unit, an engine in advance before an engine clutch is engaged when pressure in the actuator master cylinder is increased;

a fourth step of supplying hydraulic oil in the actuator master cylinder into a concentric slave cylinder by the increase in pressure in the actuator master cylinder due to the operation of the emergency actuator; and a fifth step of synchronizing and engaging the engine clutch with the engine, which is being operated in advance, while a second piston presses the engine clutch by the hydraulic oil supplied into the concentric slave cylinder.

4. The fail-safe method of claim 3, wherein in the first step, when there is no variation in pressure measured by a pressure sensor mounted on the actuator master cylinder, the failure state of the engine clutch actuator is determined by considering that there is no variation in pressure of the hydraulic oil for the conversion into the HEV mode, and the determined signal is transmitted to the hybrid control unit.

5. The fail-safe method of claim 3, wherein in the second step, the emergency actuator mounted on the actuator master cylinder is operated by a command of the hybrid control unit that has recognized the failure state of the engine clutch actuator, and presses the hydraulic oil in the actuator master cylinder toward the concentric slave cylinder.

6. The fail-safe method of claim 3, wherein in the third step, a pressure sensor mounted on the actuator master cylinder measures hydraulic oil pressure in the actuator master cylinder, and the engine is operated in advance before the engine clutch is engaged when a measured pressure value is an average pressure value or more.

* * * * *